United States Patent
Ishimasa (10) Patent No.: US 10,025,059 B2
(45) Date of Patent: Jul. 17, 2018

(54) OPTICAL APPARATUS

(71) Applicant: CANON KABUSHIKI KAISHA, Tokyo (JP)

(72) Inventor: Toru Ishimasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 14/791,799

(22) Filed: Jul. 6, 2015

(65) Prior Publication Data
US 2016/0018622 A1   Jan. 21, 2016

(30) Foreign Application Priority Data
Jul. 16, 2014   (JP) .................. 2014-145571

(51) Int. Cl.
G02B 15/14 (2006.01)
G02B 7/10 (2006.01)
G03B 3/10 (2006.01)
G02B 13/00 (2006.01)

(52) U.S. Cl.
CPC ........... *G02B 7/10* (2013.01); *G02B 13/0045* (2013.01); *G03B 3/10* (2013.01)

(58) Field of Classification Search
CPC ..................................... G02B 7/282
USPC ....... 359/676, 683, 693–706, 823, 825, 826; 396/102, 131
See application file for complete search history.

(56) References Cited

U.S. PATENT DOCUMENTS

| | | | |
|---|---|---|---|
| 5,809,357 A * | 9/1998 | Hamasaki | G03B 9/07 396/449 |
| 6,337,775 B1 | 1/2002 | Wilson | |
| 7,173,772 B2 * | 2/2007 | Masuda | G02B 7/102 310/12.04 |
| 7,706,065 B2 | 4/2010 | Regan et al. | |
| 8,837,061 B2 | 9/2014 | Ishimasa | |
| 8,974,129 B2 | 3/2015 | Ishimasa | |
| 2007/0289190 A1 * | 12/2007 | Oz | F41C 23/14 42/73 |
| 2008/0123201 A1 * | 5/2008 | Ishimasa | G02B 7/08 359/823 |

(Continued)

FOREIGN PATENT DOCUMENTS

JP   H10-096972 A   4/1998
JP   2005-055588 A   3/2005

(Continued)

OTHER PUBLICATIONS

May 8, 2018 Japanese Official Action in Japanese Patent Appln. No. 2014-145571.

*Primary Examiner* — Brandi Thomas
*Assistant Examiner* — Travis Fissel
(74) *Attorney, Agent, or Firm* — Fitzpatrick, Cella, Harper & Scinto (57) ABSTRACT

An optical apparatus includes a driving unit, a holder holding the driving unit, a moving member holding an optical member and movable by drive of the driving unit, and a guide fixed to the holder in parallel to an optical axis direction. The driving unit is fixed to the holder by a screw and a nut. The nut includes a first plane part. The nut is disposed so that the first plane part of the nut is substantially orthogonal to a line connecting a center of the guide and centers of the screw and the nut when viewed in the optical axis direction.

6 Claims, 10 Drawing Sheets

(56) References Cited

U.S. PATENT DOCUMENTS

| | | | |
|---|---|---|---|
| 2010/0321804 A1* | 12/2010 | Tsuchiya | G02B 7/022 359/823 |
| 2011/0050982 A1* | 3/2011 | Katsuyama | G02B 7/021 348/345 |
| 2013/0308203 A1* | 11/2013 | Uno | G02B 7/10 359/700 |
| 2015/0168669 A1 | 6/2015 | Ishimasa | |

FOREIGN PATENT DOCUMENTS

| | | |
|---|---|---|
| JP | 2008-052005 A | 3/2008 |
| JP | 2010-066293 A | 3/2010 |
| JP | 5253056 B2 | 4/2013 |

\* cited by examiner

OPTICAL APPARATUS

BACKGROUND OF THE INVENTION

Field of the Invention

The disclosure relates to an optical apparatus.

Description of the Related Art

Recent development advances high magnification and downsizing of an image pickup apparatus such as a camera and a video camera. The downsizing of the image pickup apparatus requires a longer travel distance of a focus lens to achieve the optical performance. Lens units in a lens barrel are moved, for example, through operation of a cam barrel and a straight barrel, or through a lead screw. The optical axis directions of the lens units are aligned, for example, by engaging cam grooves and cam followers, or by positioning the optical axes of lens frames through main guides and sub guides to regulate rotation. The method of driving lens frames through a lead screw to align the optical axis directions by using a guide shaft requires a small apparatus, and thus is greatly effective in downsizing of the lens barrel.

For example, according to Japanese Patent No. 5253056, a moving frame movable straight in an optical axis direction through operation of the cam barrel and the straight barrel is provided with a driving source for the focus lens. The driving source is moved in accordance with a zoom operation of the lens barrel, and a focus lens frame is driven in the optical axis direction through a lead screw attached to an output shaft of the driving source, thereby providing the travel distance of a focus lens unit. According to Japanese Patent Laid-open No. 2005-55588, the driving source for the focus lens is fixed to a flange part fixed to the lens barrel, and an end of the guide shaft is fixed to the flange part.

According to Japanese Patent No. 5253056, the driving source and the guide shaft are fixed to the straight barrel. Since a screw for fixing the driving source for the focus lens is provided close to the guide shaft, fastening the screw causes expansion of a pilot hole for the screw, which may incline the guide shaft.

According to Japanese Patent Laid-open No. 2005-55588, the guide shaft is close to a part where the driving source for the focus lens is fixed, and part of the guide shaft is fixed to the flange part. Thus, fixation of the flange part may cause the inclination of the guide shaft and a reduced positioning accuracy of the guide shaft.

SUMMARY OF THE INVENTION

The disclosure provides an optical apparatus that achieves prevention of inclination of a guide and an increased freedom in arrangement of, for example, a driving unit and a guide.

An optical apparatus as one aspect of the disclosure includes a driving unit, a holder holding the driving unit, a moving member holding an optical member and movable by drive of the driving unit, and a guide fixed to the holder in parallel to an optical axis direction. The driving unit is fixed to the holder by a screw and a nut. The nut includes a first plane part and is disposed so that the first plane part of the nut is substantially orthogonal to a line connecting a center of the guide and centers of the screw and the nut when viewed in the optical axis direction.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1:
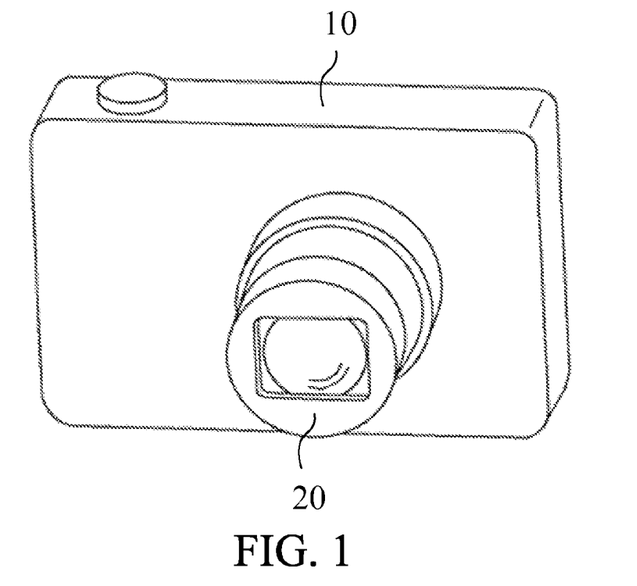
FIG. 1 is a perspective view of an optical apparatus according to an embodiment of the disclosure.
Figure 2:
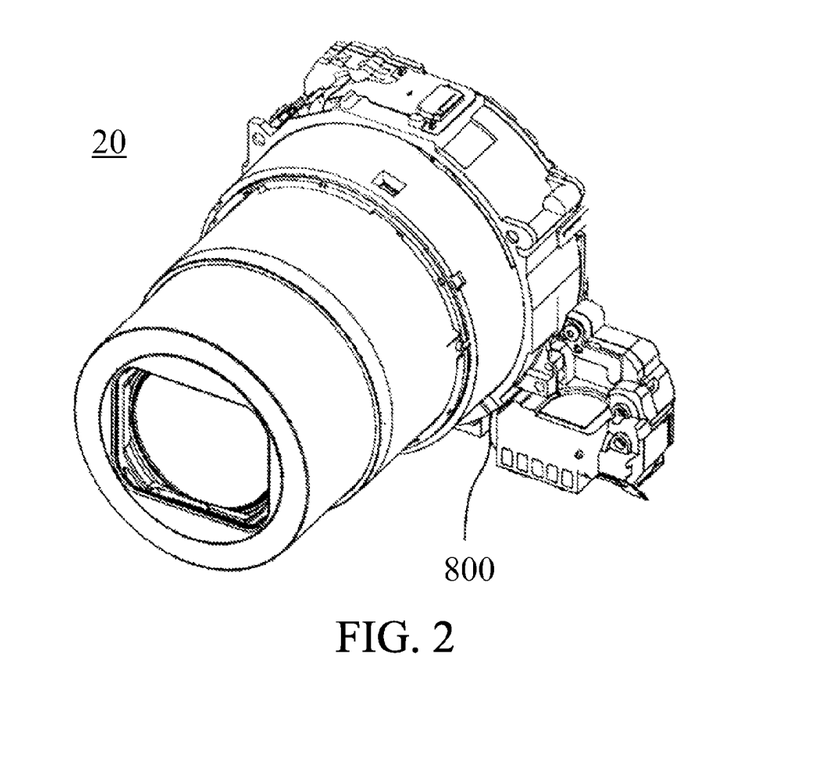
FIG. 2 is a perspective view of a lens barrel.

FIG. 1 is a perspective view of a digital camera as an example of an optical apparatus according to an embodiment of the disclosure. FIG. 2 is a perspective view of a lens barrel 20 mounted on the digital camera illustrated in FIG. 1. The digital camera in the present embodiment includes the lens barrel 20 capable of zooming and provided on a front side of a camera body 10. The lens barrel 20 changes an image pickup magnification through an image pickup optical system movable between an image pickup position and a retracted position in a direction (optical axis direction) of an optical axis by a zoom driving unit 800.

Figure 3:
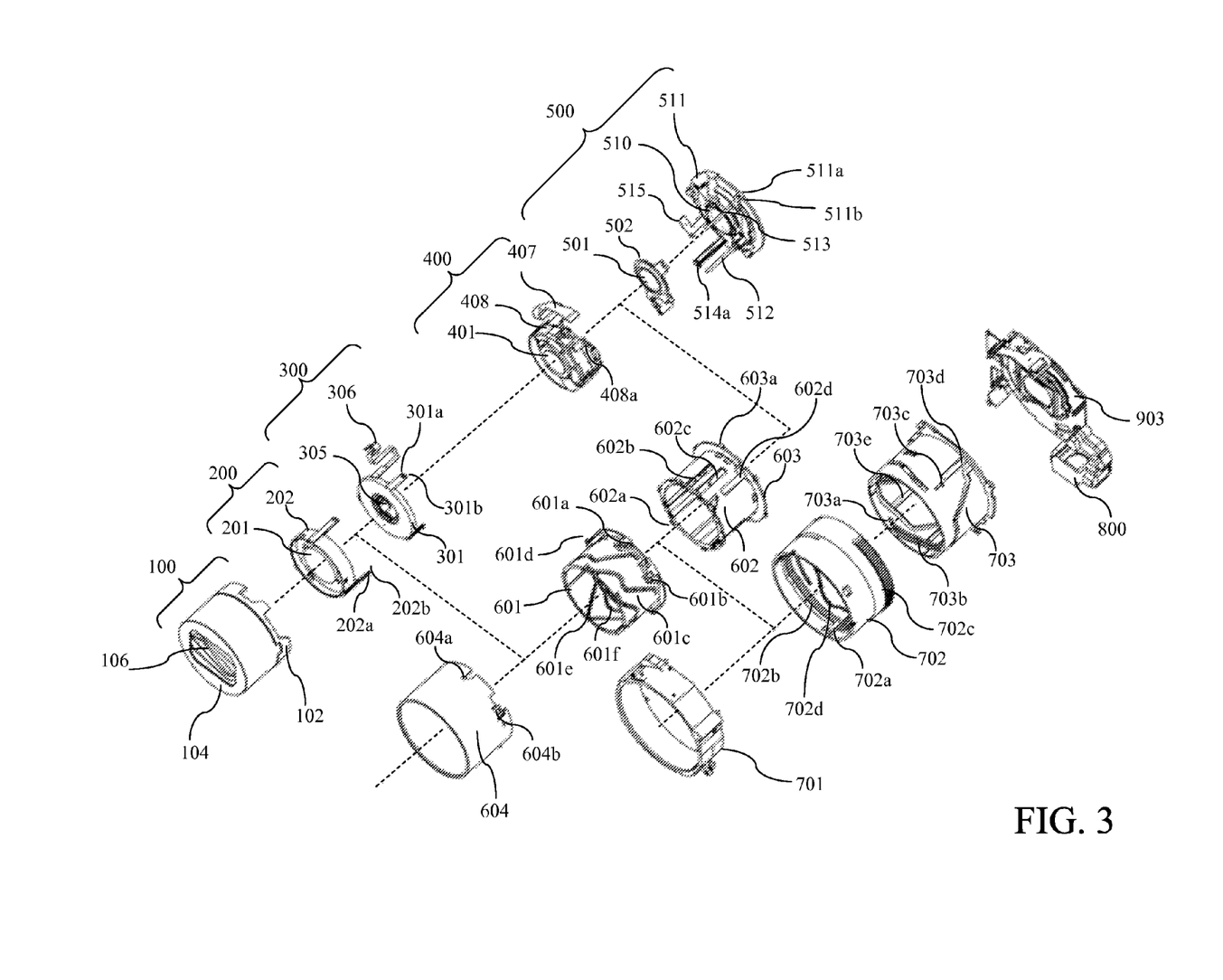
FIG. 3 is an exploded perspective view of the lens barrel.
Figure 4:
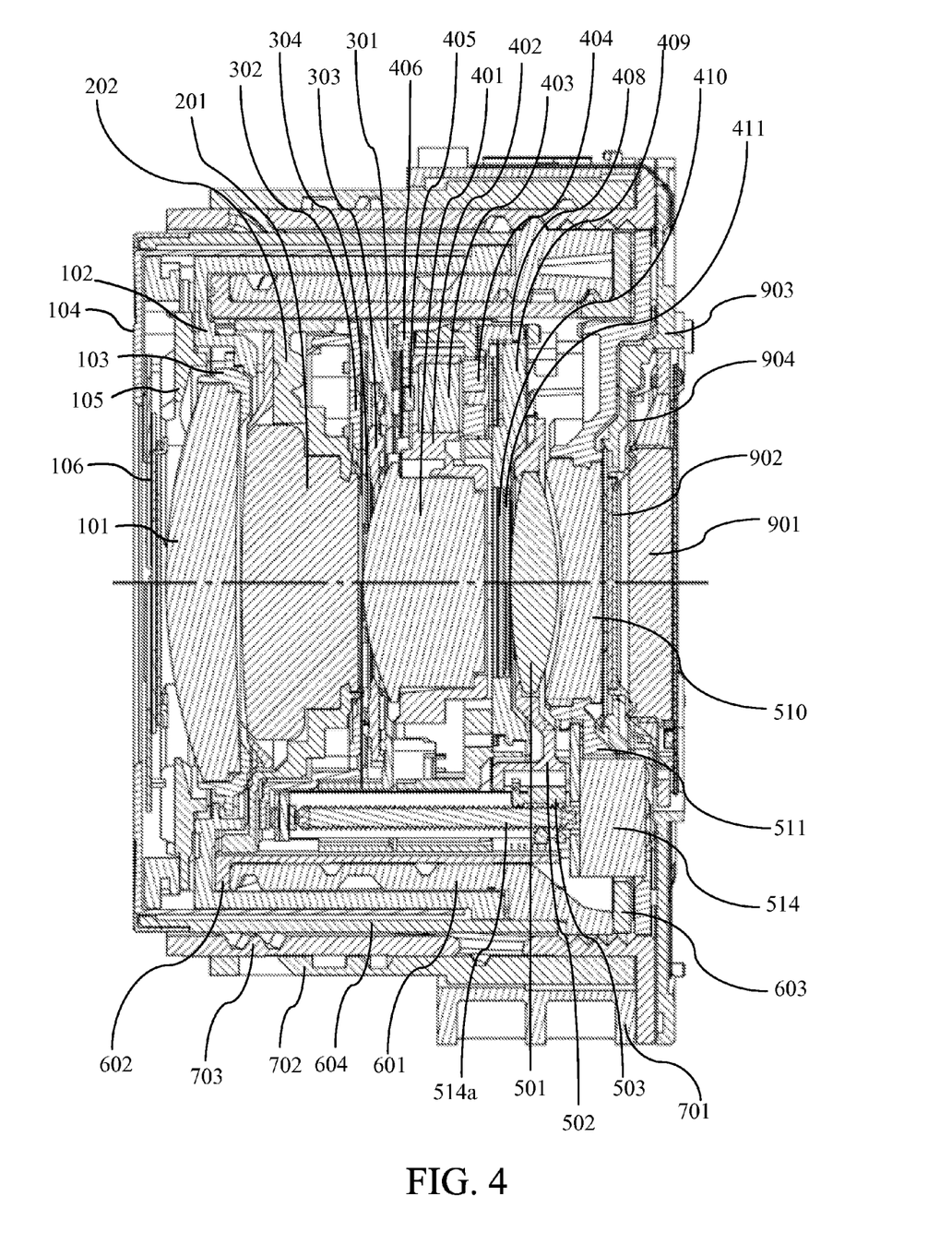
FIG. 4 is a sectional view of the lens barrel in a retracted state.
Figure 5:
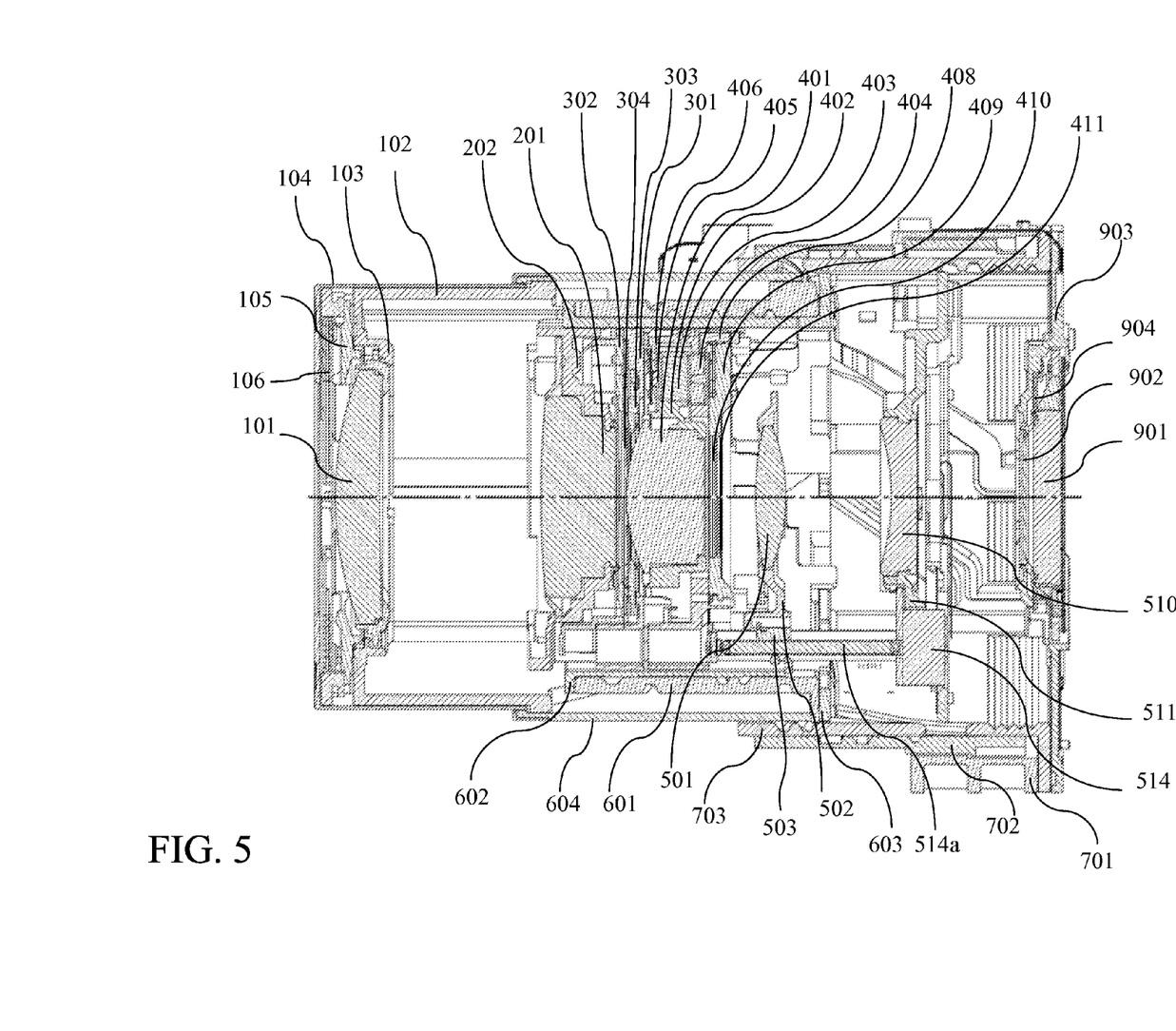
FIG. 5 is a sectional view of the lens barrel in an image pickup state.

FIG. 3 is an exploded perspective view of the lens barrel 20. FIG. 4 is a sectional view of the lens barrel 20 in a retracted state. FIG. 5 is a sectional view of the lens barrel 20 in an image pickup state.

The lens barrel 20 includes a first lens unit 100, a second lens unit 200, an aperture unit 300, a third lens unit 400, and a fifth lens unit 500. A first lens 101, a second lens 201, a third lens 401, a fourth lens 501, and a fifth lens 510 serve as the image pickup optical system of the lens barrel 20.

The first lens unit 100 has a barrier mechanism including a first lens holder 103 holding the first lens 101, a first lens unit barrel 102 holding the first lens holder 103, a first lens unit cap 104, a barrier drive ring 105, and a plurality of barrier blades 106. The first lens unit barrel 102 is provided with a straight groove (not illustrated) that engages with a straight key 602a of a first straight barrel 602, and a follower (not illustrated) that engages with a cam groove 601c of an inner cam barrel 601. The straight groove and the follower are each formed at six positions spaced at substantially equal intervals in a circumferential direction on an inner peripheral part of the first lens unit barrel 102.

The second lens unit 200 includes the second lens 201 and a second lens holder 202 holding the second lens 201. The second lens holder 202 is provided with a follower 202a that engages with a cam groove 601e of the inner cam barrel 601, and a straight key 202b that engages with a straight guide 602b of the first straight barrel 602. The follower 202a and the straight key 202b are each formed at three positions spaced at substantially equal intervals in the circumferential direction.

The aperture unit 300 includes an aperture stop base plate 301, an aperture stop cover 302, a drive ring 303, a plurality of aperture stop blades 304, an aperture stop driving source 305, and a flexible printed board (FPC) 306. The aperture stop base plate 301 is provided with a follower 301a that engages with a cam groove 601f of the inner cam barrel 601, and a straight key 301b that engages with a straight guide 602c of the first straight barrel 602. The follower 301a and the straight key 301b are each formed at three positions spaced at substantially equal intervals in the circumferential direction. A gear (not illustrated) provided to an end of the aperture stop driving source 305 is coupled with a gear part (not illustrated) formed on the drive ring 303. The aperture stop blades 304 are moved to form an intended opening shape through rotation of the drive ring 303 about the optical axis.

The third lens unit 400 includes an image stabilizer and a shutter ND unit. A third holder 402 holds the third lens 401 and a pair of IS magnets 403. A pair of IS coils 404 are fixed on an object side of a shutter base plate 408 at positions opposite to the IS magnets 403. The third holder 402 is held movable in a plane orthogonal to the optical axis by tension of a pair of IS springs (not illustrated) through a plurality of IS balls (not illustrated). A pair of Hall sensors 405 held on a flexible printed board (FPC) 407 are held at positions opposite to the IS magnets 403 by a sensor holder 406. When electricity is supplied to the IS coils 404 through the FPC 407, a Lorentz force is exerted between the IS coils 404 and the IS magnets 403. The third holder 402, which is then moved in the plane orthogonal to the optical axis and whose position is controlled by the Hall sensors 405, prevents a hand shake. A pair of shutter blades 409, a shutter driving source (not illustrated), an ND filter 410, an ND filter driving source (not illustrated), and a shutter cover 411 are attached on an image sensor side of the shutter base plate 408. The shutter blades 409 and the ND filter 410 are rotatably supported by the shutter base plate 408 and respectively driven by the shutter driving source and the ND filter driving source to be moved in the plane orthogonal to the optical axis to open and close an optical path, thereby serving as a light quantity adjusting apparatus.

The fifth lens unit 500 has a focus mechanism including the fourth lens (optical member) 501, a fourth lens holder (moving member) 502, a rack 503, and a rack spring 504. The fifth lens unit 500 further includes the fifth lens 510, a fifth unit base (holder) 511, a main guide (guide) 512, a sub guide 513, a focus motor (driving unit) 514, a flexible printed board (FPC) 515, a screw 516, and a nut 517. The fifth unit base 511 holds the fifth lens 510, and fixes the focus motor 514 connected to the FPC 515, by the screw 516 and the nut 517. The main guide 512 and the sub guide 513 are fixed by pressing in the fifth unit base 511 in parallel to the optical axis direction. The fifth unit base 511 is provided with a follower 511a that engages with a cam groove 702d of an outer cam barrel 702, and a straight key 511b that engages with a straight groove 703d of a fixed barrel 703. The fourth lens holder 502 holds the fourth lens 501, the rack 503, and the rack spring 504. Rotation of the fourth lens holder 502 is regulated by the main guide 512 and the sub guide 513. The focus motor 514 drives the fourth lens holder 502 holding the fourth lens 501 as a focus lens to an optional position in the optical axis direction through feed by a lead screw 514a and the rack 503, thereby achieving focusing by the lens barrel 20. In the present embodiment, the focus motor 514 is a stepping motor.

The inner cam barrel 601 rotatably holds, in its inner peripheral part, the first straight barrel 602 and a second straight barrel 603. The inner cam barrel 601 is provided with, on its inner peripheral part, the cam groove 601e that engages with the follower 202a of the second lens holder 202, and the cam groove 601f that engages with the follower 301a of the aperture unit 300. The cam groove 601e and the cam groove 601f are each formed at three positions spaced at substantially equal intervals in the circumferential direction. The inner cam barrel 601 is also provided with, on its outer peripheral part, a follower 601a that engages with a cam groove 703a of the fixed barrel 703, an engagement member 601b that engages with an engagement member 604b of an inner cam cover 604, and a drive key 601d that engages with a straight groove 702a of the outer cam barrel 702. The follower 601a, the engagement member 601b, and the drive key 601d are each formed at three positions spaced at substantially equal intervals in the circumferential direction. The inner cam barrel 601 is also provided with the cam groove 601c that engages with the follower (not illustrated) of the first lens unit barrel 102 and is formed at six positions spaced at substantially equal intervals in the circumferential direction.

The first straight barrel 602 and the second straight barrel 603 are engaged with each other and rotatably movable on the inner peripheral part of the inner cam barrel 601. The first straight barrel 602 is provided with, on its outer peripheral part, the straight key 602a that engages with the straight groove (not illustrated) of the first lens unit barrel 102. The first straight barrel 602 is provided with, on its inner peripheral part, the straight guide 602b that engages with the straight key 202b of the second lens holder 202, the straight guide 602c that engages with the straight key 301b of the aperture stop base plate 301, and a straight guide 602d that engages with a straight key 408a of the shutter base plate 408. The second straight barrel 603 is provided with, on its outer peripheral part, a straight key 603a that engages with a straight groove 703e of the fixed barrel 703 and is formed at six positions spaced at substantially equal intervals in the circumferential direction.

The inner cam cover 604 is provided with, on its outer peripheral part, a follower 604a that engages with a cam groove 703b of the fixed barrel 703, and on its inner peripheral part, the engagement member 604b that engages with the engagement member 601b of the inner cam barrel 601. The follower 604a and the engagement member 604b are each formed at three positions spaced at substantially equal intervals in the circumferential direction.

The fixed barrel 703 is provided with, on its inner peripheral part, the straight groove 703e that engages with the straight key 603a of the second straight barrel 603 and is formed at six positions spaced at substantially equal intervals in the circumferential direction. The fixed barrel 703 is also provided with, on its inner peripheral part, the cam groove 703a that engages with the follower 601a of the inner cam barrel 601, the cam groove 703b that engages with the follower 604a of the inner cam cover 604, and the straight groove 703d that engages with the straight key 511b of the fifth unit base 511. The cam groove 703a, the cam groove 703b, and the straight groove 703d are each formed at three positions spaced at substantially equal intervals in the circumferential direction. The fixed barrel 703 rotatably holds, on its outer peripheral part, the outer cam barrel 702. The fixed barrel 703 is provided with, on its outer peripheral part, a follower 703c that engages with a cam groove 702b of the outer cam barrel 702 and is formed at three positions spaced at substantially equal intervals in the circumferential direction.

The outer cam barrel 702 is provided with, on its outer peripheral part, a gear part 702c that is coupled with the zoom driving unit 800, and a cover barrel 701. The outer cam barrel 702 is provided with, on its inner peripheral part, the cam groove 702b that engages with the follower 703c of the fixed barrel 703, the straight groove 702a that engages with the drive key 601d of the inner cam barrel 601, and the cam groove 702d that engages with the follower 511a of the fifth unit base 511. The cam groove 702b, the straight groove 702a, and the cam groove 702d are each formed at three positions spaced at substantially equal intervals in the circumferential direction.

A sensor holder (fixing member) 903 holds the zoom driving unit 800, an image pickup element 901, an optical element 902, and a sensor rubber 904.

Next, zoom drive of the lens barrel 20 will be described. The zoom driving unit 800 drives the outer cam barrel 702 to move in the optical axis direction through a lift provided by the cam groove 702b while rotating relative to the fixed barrel 703, and the inner cam barrel 601 is rotated by the outer cam barrel 702. Simultaneously, the second straight barrel 603, which is rotatably held on the inner peripheral part of the inner cam barrel 601, rotates while being regulated by the fixed barrel 703, and accordingly the inner cam barrel 601 is rotatably moved in the optical axis direction through a lift provided by the cam groove 703a of the fixed barrel 703.

The first lens unit 100, the second lens unit 200, the aperture unit 300, and the third lens unit 400 are rotated while being regulated by the first straight barrel 602, and are moved straight in the optical axis direction through a lift provided by the cam groove formed in the inner cam barrel 601. The fifth lens unit 500 is rotated while being regulated by the fixed barrel 703, and is moved straight in the optical axis direction through a lift provided by the cam groove 702d of the outer cam barrel 702. The fourth lens 501 is moved straight in the optical axis direction along the main guide 512 and the sub guide 513 through operation of the focus motor 514 and the rack 503 irrespective of drive of the outer cam barrel 702 and the fixed barrel 703.

In this manner, the lens barrel 20 is extended from the retracted state to the image pickup state in the optical axis direction by rotation of the outer cam barrel 702, or by movement of the fourth lens 501 in the optical axis direction to an optional position, which is driven by the focus motor 514 through the FPC 515.

Next, a method of fixing the focus motor 514 will be described with reference to FIGS. 6 to 9.

Figure 6:
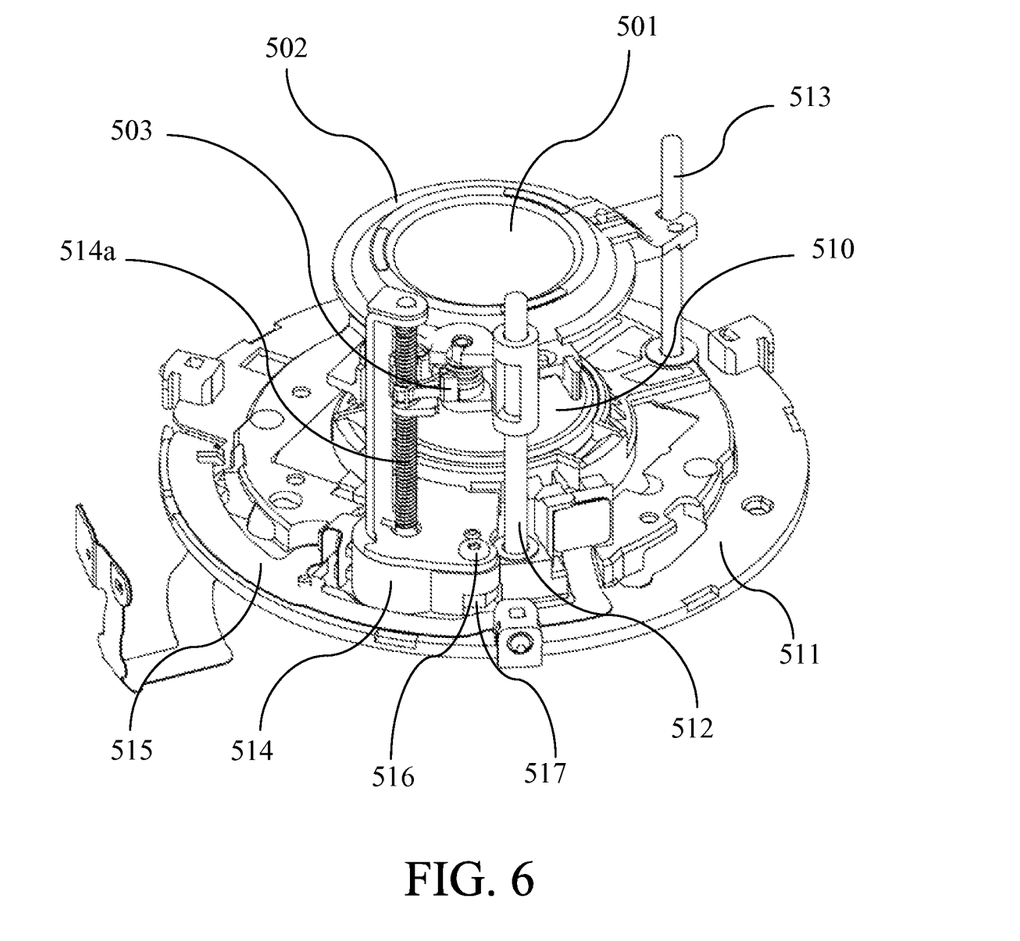
FIG. 6 is a perspective view of a fifth lens unit.
Figure 7:
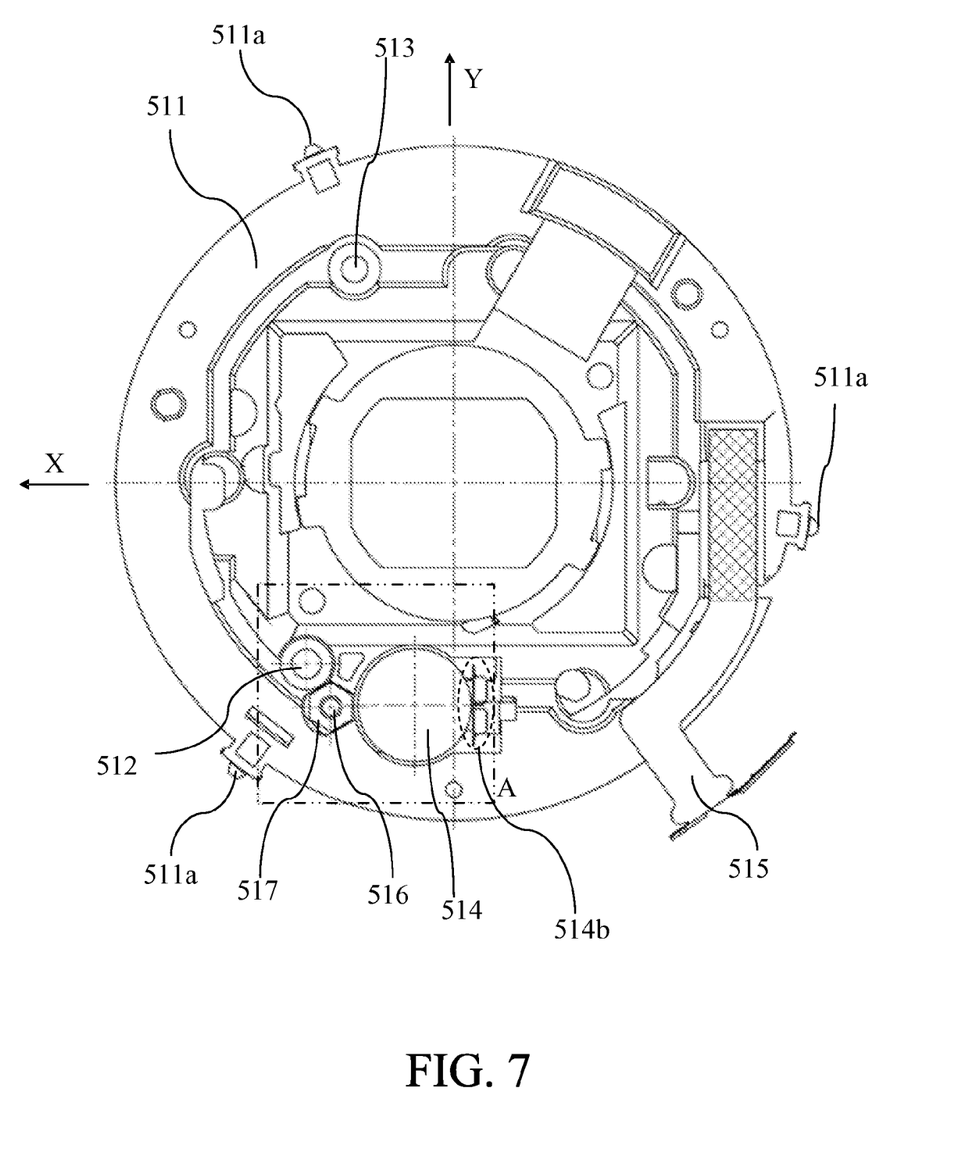
FIG. 7 is a back view of the fifth lens unit.
Figure 8:
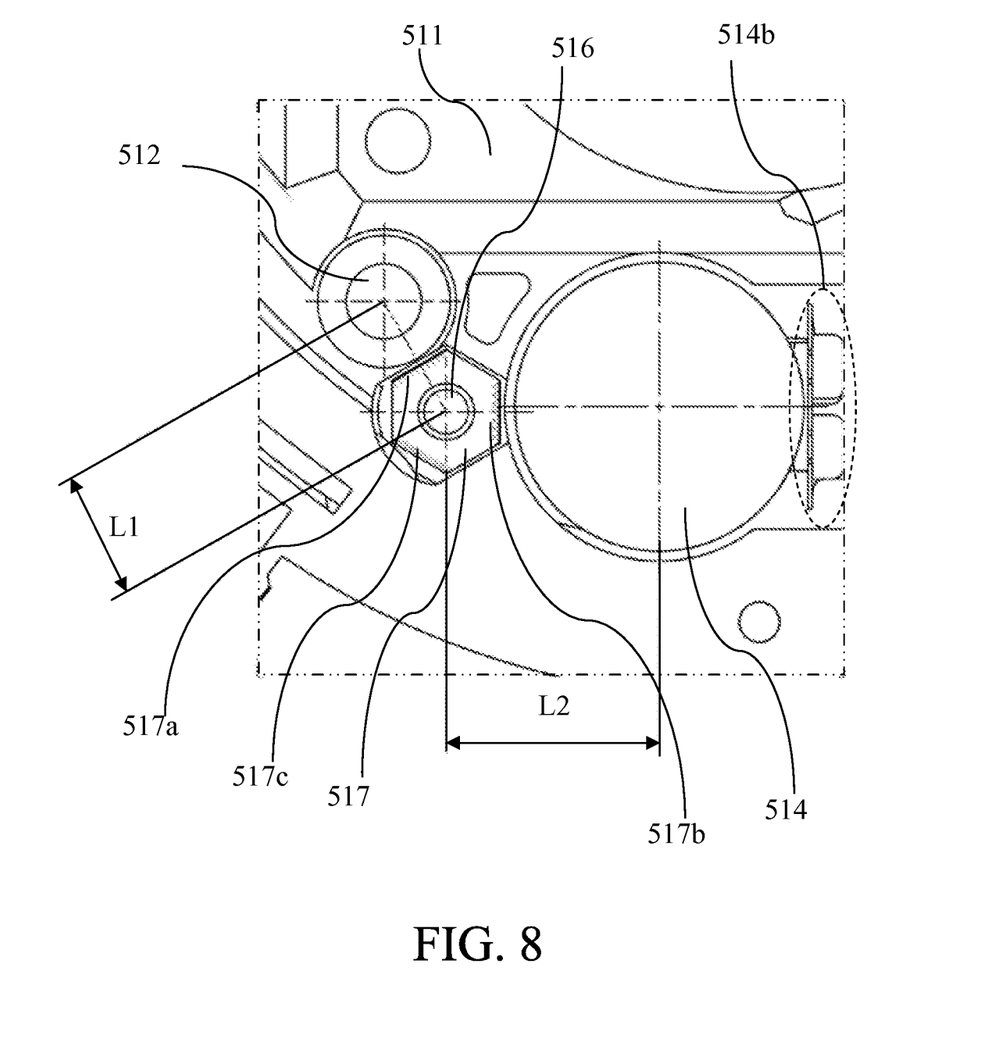
FIG. 8 is an enlarged view of part A in FIG. 7.
Figure 9:
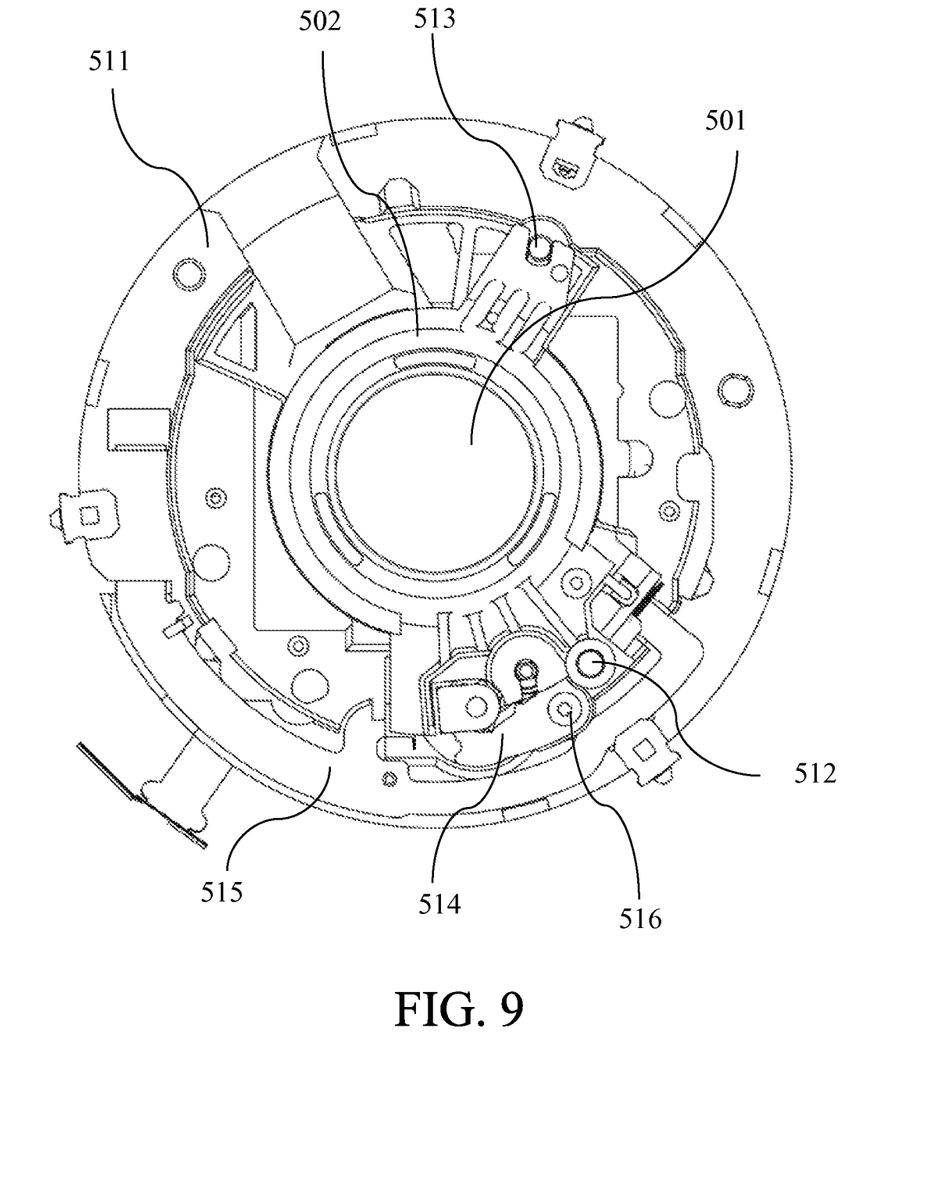
FIG. 9 is a front view of the fifth lens unit.

FIG. 6 is a perspective view of the fifth lens unit 500. FIG. 7 is a back view of the fifth lens unit 500 when viewed from the image pickup element 901 side. FIG. 8 is an enlarged view of part A in FIG. 7. FIG. 9 is a front view of the fifth lens unit 500 when viewed from an object side.

The fourth lens 501 is moved straight in the optical axis direction along the main guide 512 and the sub guide 513 through operation of the lead screw 514a and the rack 503 that are integrally formed on an output shaft of the focus motor 514. Thus, the main guide 512 is desirably disposed near the focus motor 514.

The screw 516, the nut 517, and the main guide 512 of the fifth lens unit 500 are disposed on a side opposite to a focus motor terminal part 514b with respect to the lead screw 514a in order to facilitate wiring of the FPC 515 and assembly. Since the first and second straight barrels 602 and 603 are positioned between the focus motor 514 and the lens barrel 20, the screw 516 and the nut 517 cannot be disposed therebetween. For this reason, the screw 516 and the nut 517 are disposed between the main guide 512 and the focus motor 514. The main guide 512 and the screw 516 and nut 517 are separated by a distance L1 sufficiently exceeding a thickness required for press fitting of the main guide 512. The focus motor 514 and the screw 516 and nut 517 are separated by a distance L2 sufficiently exceeding a thickness required for the fixation of the focus motor 514 by the screw 516 and the nut 517.

Figure 10A:
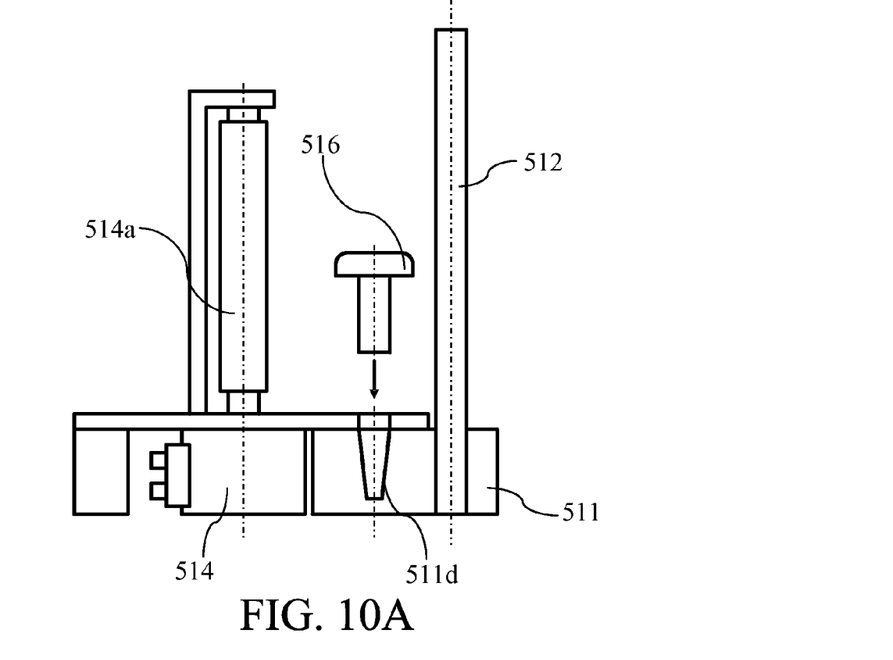
FIG. 10A is a conceptual diagram of conventional focus motor fixation (before screw fastening).
Figure 10B:
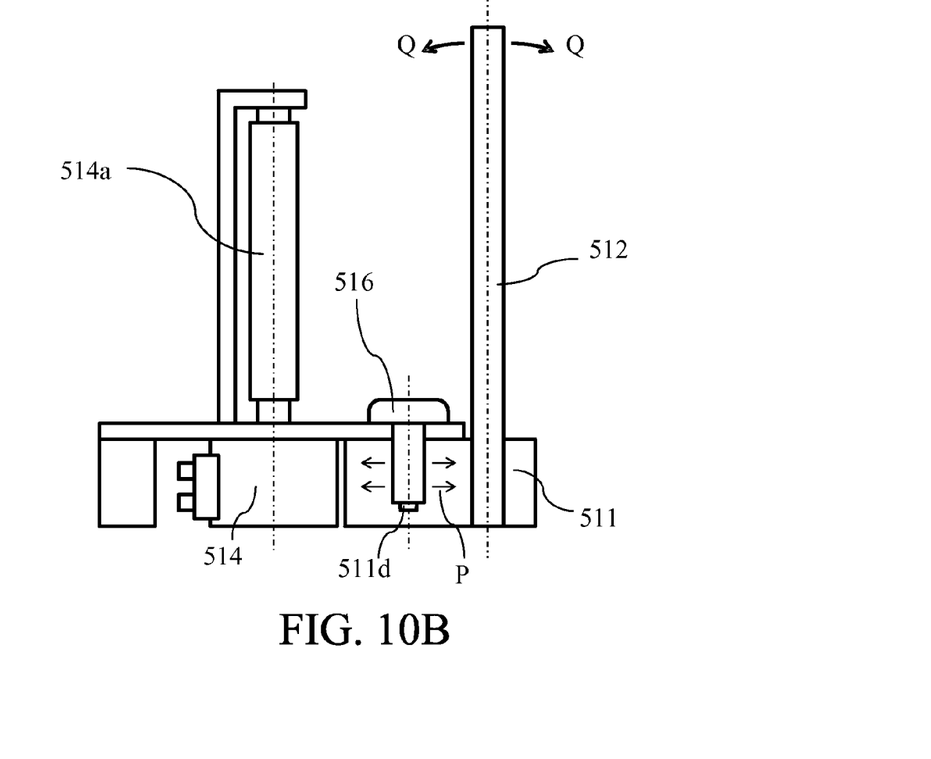
FIG. 10B is a conceptual diagram of the conventional focus motor fixation (after screw fastening).
Figure 11A:
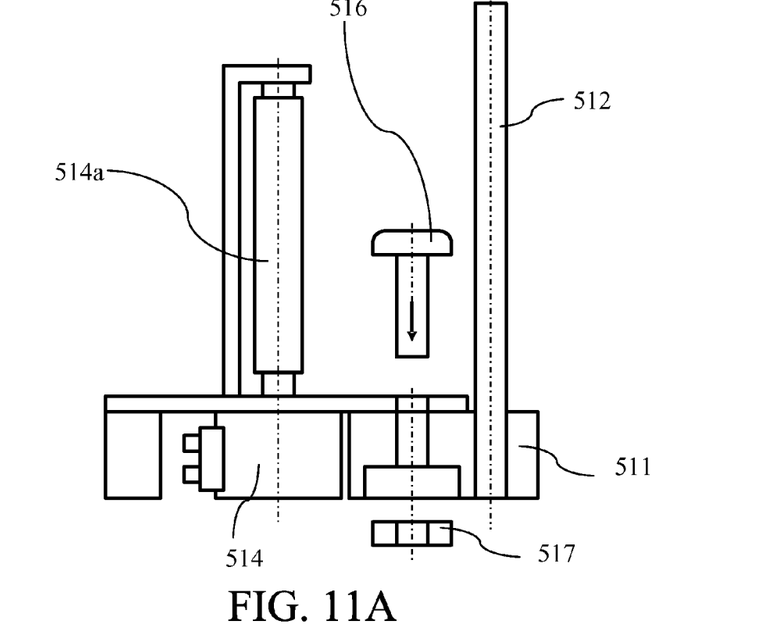
FIG. 11A is a conceptual diagram of focus motor fixation (before screw fastening) in the present embodiment.
Figure 11B:
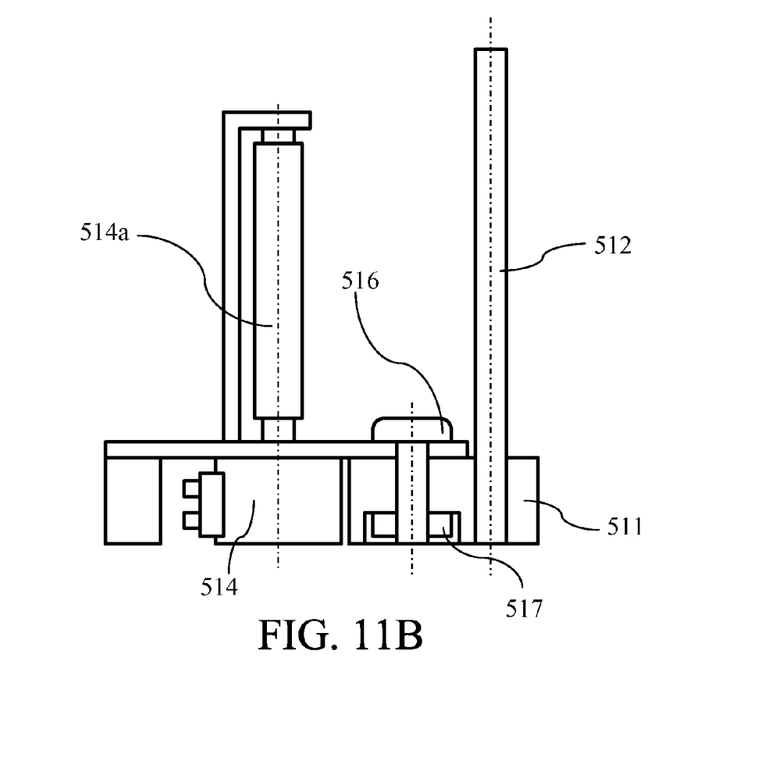
FIG. 11B is a conceptual diagram of the focus motor fixation (after screw fastening) in the present embodiment.

FIG. 10A is a conceptual diagram of conventional focus motor fixation (before screw fastening). FIG. 10B is a conceptual diagram of the conventional focus motor fixation (after screw fastening). FIG. 11A is a conceptual diagram of focus motor fixation (before screw fastening) in the present embodiment. FIG. 11B is a conceptual diagram of the focus motor fixation (after screw fastening) in the present embodiment.

Conventionally, as illustrated in FIG. 10A, in order to facilitate downsizing and assembly of the lens barrel, the main guide 512, the focus motor 514, and the screw 516 are typically disposed in a similar manner to the present embodiment, and the screw 516 is typically a self-tapping screw. However, fastening the self-tapping screw expands a pilot hole 511d in the direction of arrow P as illustrated in FIG. 10B, and deforms the shape of a fastening part. Thus, in such an arrangement as described in the present embodiment, fastening the focus motor 514 by the self-tapping screw involves deformation of the pilot hole 511d and thus inclination of the main guide 512 in the direction of arrow Q, so that an intended optical performance would not be achieved.

However, in the present embodiment as illustrated in FIG. 11A, a machine screw is used as the screw 516, and a housing part for housing the nut 517 is formed between a part where the focus motor 514 is held and a part to which the main guide 512 is fixed in the fifth unit base 511. The focus motor 514 is fixed to the fifth unit base 511 by the nut 517. This prevents, as illustrated in FIG. 11B, the deformation of the fifth unit base 511 due to the expansion of the pilot hole 511d otherwise caused with the use of the self-tapping screw.

The nut 517 includes a plane part (first plane part) 517a. The nut 517 is housed in the housing part of the fifth unit base 511 so that the plane part 517a of the nut 517 is substantially orthogonal to a line connecting the center of the main guide 512 and the centers of the screw 516 and the nut 517. This allows reduction in the distance L1 between the main guide 512 and the screw 516 and nut 517. The nut 517 also includes a plane part (second plane part) 517b. The nut 517 is housed in the housing part of the fifth unit base 511 so that the plane part 517b of the nut 517 is substantially orthogonal to a line connecting the center of the focus motor 514 and the centers of the screw 516 and the nut 517. This allows reduction in the distance L2 between the focus motor 514 and the screw 516 and nut 517. The nut 517 also includes a plane part 517c formed on a side of the nut 517, which faces to the outer periphery of the fifth lens unit 500, to avoid interference with the first and second straight barrels 602 and 603. This allows the nut 517 to be disposed at an outermost position in the radial direction of the lens barrel 20 while avoiding interfere with the first and second straight barrels 602 and 603.

As illustrated in FIG. 8, the nut 517 is provided with identical surfaces between the plane parts 517a, 517b, and 517c, to facilitate assembly, and thus has a substantially regular hexagonal shape.

As illustrated in FIG. 9, the screw 516 is disposed at a position observable when viewed from the object side, which allows the screw 516 and the focus motor 514 to be detached from the fifth lens unit 500 when completely assembled.

The above-described configuration in the present embodiment can prevent inclination of the main guide 512 and thus improve the performance of the lens barrel 20.

The configuration provides an increased freedom in arrangement of a lens driving mechanism including the main guide 512, the focus motor 514, the screw 516, and the nut 517, and other components, which allows downsizing of the lens barrel 20.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-145571, filed on Jul. 16, 2014, which is hereby incorporated by reference herein in its entirety.

What is claimed is:

1. An optical apparatus comprising:
    a driving unit holding a lead screw;
    a holder holding the driving unit;
    a moving member that holds an optical member and that moves in an optical axis direction along the lead screw by drive of the driving unit; and
    a guide that is pressed into and fixed to the holder in parallel to the optical axis direction,
    wherein the driving unit is fixed to the holder by a screw, which extends in the optical axis direction, and a nut,
    wherein the nut (a) includes a first plane part and a second plane part different from the first plane part, and (b) when viewed in the optical axis direction, is formed in a polygonal shape,
    wherein, when viewed in the optical axis direction, the nut is disposed so that the first plane part of the nut is substantially orthogonal to a line connecting a center of the guide and a center of the nut,
    wherein, when viewed in the optical axis direction, the nut is disposed so that the second plane part of the nut is substantially orthogonal to a line connecting a center of the driving unit and the center of the nut,
    wherein, when viewed in a direction orthogonal to the optical axis direction, the holder includes a housing part for housing the nut, which is formed between a part where the driving unit is held and a part to which the guide is fixed, and a gap is formed between the nut and the housing part, and
    wherein when viewed in a direction orthogonal to the optical axis direction, a position in the optical axis direction of a part of the holder at which the nut is arranged and a position in the optical axis direction of a part of the holder at which the guide is fixed by press fitting are overlapped with each other.

2. The optical apparatus according to claim 1, wherein the driving unit is a stepping motor,
    wherein an output shaft of the driving unit is provided with a lead screw, and
    wherein the moving member moves through feeding by the lead screw.

3. The optical apparatus according to claim 1, wherein the holder moves in the optical axis direction by a cam barrel and a straight barrel.

4. The optical apparatus according to claim 1, wherein the optical member is a focus lens.

5. The optical apparatus according to claim 1, wherein when viewed in the optical axis direction, the nut is formed in a regular hexagonal shape.

6. The optical apparatus according to claim 1, wherein another end of the guide, which another end is not fixed to the holder, is not fixed to any members of the optical apparatus.

* * * * *